US010483562B2

(12) United States Patent
Jahnke et al.

(10) Patent No.: US 10,483,562 B2
(45) Date of Patent: Nov. 19, 2019

(54) SYSTEM FOR REBALANCING A PRESSURE DIFFERENTIAL IN AN ANODE EXHAUST SYSTEM OF A FUEL CELL WITH A RELATIONAL WATER SEAL

(71) Applicant: FuelCell Energy, Inc., Danbury, CT (US)

(72) Inventors: Fred C. Jahnke, Rye, NY (US); Matthew Lambrech, Sherman, CT (US); Joseph M. Daly, Bethel, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 225 days.

(21) Appl. No.: 15/630,805

(22) Filed: Jun. 22, 2017

(65) Prior Publication Data

US 2018/0375121 A1    Dec. 27, 2018

(51) Int. Cl.
| | |
|---|---|
| *H01M 8/00* | (2016.01) |
| *H01M 8/04089* | (2016.01) |
| *H01M 8/24* | (2016.01) |
| *H01M 8/04746* | (2016.01) |
| *H01M 8/14* | (2006.01) |

(52) U.S. Cl.
CPC ... *H01M 8/04104* (2013.01); *H01M 8/04097* (2013.01); *H01M 8/04753* (2013.01); *H01M 8/04761* (2013.01); *H01M 8/04783* (2013.01); *H01M 8/24* (2013.01); *H01M 2008/147* (2013.01)

(58) Field of Classification Search
CPC ............. H01M 8/04104; H01M 8/24; H01M 8/04097; H01M 2008/147; H01M 8/04761; H01M 8/04783; H01M 8/04753
See application file for complete search history.

(56) References Cited

U.S. PATENT DOCUMENTS

| | | | |
|---|---|---|---|
| 9,190,676 B2 | 11/2015 | Snyder et al. | |
| 2007/0248856 A1* | 10/2007 | Ueda | H01M 8/04014 429/423 |

FOREIGN PATENT DOCUMENTS

| | | |
|---|---|---|
| JP | S58-164159 A | 9/1983 |
| JP | H06-036785 A | 2/1994 |

OTHER PUBLICATIONS

Invitation to Pay Additional Fees and Partial Search Report for PCT/US2018/025274 dated Jun. 29, 2018 (18 pages).
International Search Report and Written Opinion for PCT/US2018/025274 dated Aug. 23, 2018 (29 pages).

* cited by examiner

*Primary Examiner* — Cynthia H Kelly
*Assistant Examiner* — Monique M Wills
(74) *Attorney, Agent, or Firm* — Foley & Lardner LLP (57) ABSTRACT

A fuel cell system includes at least one fuel cell module and at least one relational water seal configured to limit a magnitude of a pressure differential in the fuel cell system in an anode under-pressurization situation in which the second pressure exceeds the first pressure by at least a first predetermined amount. The fuel cell module includes a fuel cell assembly having one or more fuel cells arranged in a stack configuration, an anode inlet manifold, an anode outlet manifold having a first pressure, a cathode inlet manifold having a second pressure, and a cathode outlet manifold.

18 Claims, 11 Drawing Sheets

SYSTEM FOR REBALANCING A PRESSURE DIFFERENTIAL IN AN ANODE EXHAUST SYSTEM OF A FUEL CELL WITH A RELATIONAL WATER SEAL

STATEMENT OF GOVERNMENT RIGHTS

This invention was made with government support under Cooperative Agreement DE-EE0003679 awarded by the U.S. Department of Energy. The government has certain rights in this invention.

BACKGROUND

The present disclosure relates to a system and method for preventing pressure damage to a fuel cell. In particular, the present disclosure relates to relational and bidirectional water seals for fuel cell pressure balance when processing anode exhaust gas.

In general, a fuel cell includes a negative or anode electrode and a positive or cathode electrode separated by an electrolyte that serves to conduct electrically charged ions between them. A fuel cell will continue to be able to produce electric power as long as fuel and oxidant are supplied to the anode and cathode, respectively. To achieve this, gas flow fields are provided adjacent to the anode and cathode through which fuel and oxidant gas are supplied. In order to produce a useful power level, a number of individual fuel cells are stacked in series with an electrically conductive separator plate between each fuel cell and an adjacent fuel cell.

In high temperature fuel cell stacks, fresh air usually serves as oxidant and is provided at the entry of the cathode-side of the fuel cell stack. This fresh air is typically at ambient temperature and must be heated to the operating temperature of the fuel cell stack. Conventionally, unused fuel in the anode exhaust gas exiting from the anode-side of the fuel cell stack is oxidized, or burned, with the incoming fresh air to heat the air. In order to ensure complete reaction of fuel and to minimize temperature gradients, the anode-exhaust must be completely mixed with air.

During operation of the fuel cell stack, at a junction of the two process gas streams, gas pressure at the exit of the anode-side of the fuel cell stack is coupled to gas pressure at the inlet of the cathode-side of the fuel cell stack. Typically, the pressure at the exit of the anode-side is necessarily higher than the pressure at the inlet of the cathode-side by an amount required to overcome pressure losses associated with any connection piping and with the oxidizer used to burn the anode exhaust and incoming oxidant gases. An anode exhaust processing system may be added to address both the gas mixing and the pressure differential problems. The anode exhaust processing system may include, for example, a mixer-eductor-oxidizer (MEO) that oxidizes unconverted anode fuel, preheats inlet air, recycles carbon dioxide ($CO_2$) to the cathode, and reduces the pressure difference between the anode and cathode gas streams.

When water recovery and/or hydrogen or anode exhaust export is added to the fuel cell system, a blower is normally incorporated to offset the added pressure drop of the anode exhaust processing system, to pressure balance the anode and the cathode of the fuel cell. During upsets in the operation of the system (i.e., abnormal operation situations), for example, when the fuel cell system has a rapid change in power output or the blower malfunctions, a substantial pressure imbalance between the anode and the cathode of the fuel cell can occur. For example, upon a rapid reduction in power output a pressure imbalance can result from the fact that the steam and carbon dioxide flow from the fuel cell anode exhaust is instantaneously reduced. Meanwhile, the anode exhaust blower may take several seconds to reduce speed. During this time, there is insufficient flow relative to the blower speed, resulting in low anode pressure relative to cathode pressure (i.e., anode under-pressurization). On the other hand, if the blower speed is too slow, for example, due to loss of power to a speed controller of the blower or other blower or controller failure, then high anode pressure relative to cathode pressure will result (i.e., anode over-pressurization). A high pressure differential between the anode and the cathode may damage the seals of the fuel cell.

A conventional method of avoiding anode over-pressurization is to use a water seal that vents to atmosphere. In this case, to keep the same level of overpressure protection, the water level in the water seal must be adjusted according to changes in system pressure. If the water level is too low relative to system pressure, then process gases can escape through the water seal under non-upset, normal operating conditions. If the water level is too high relative to system pressure, then the water seal would lose the desired over-pressure protection desired because the water seal would not activate until a greater than desired overpressure event occurred. These are the limitations of the conventional water seal that vents to atmosphere in preventing anode over-pressurization. Alternatively, another conventional method of avoiding anode over-pressurization is to use a relief valve that vents to atmosphere in place of the conventional water seal that vents to atmosphere. Compared to the water seal the relief valve may have advantages of simplicity and cost, but may be more difficult or less reliable to adjust the relief pressure compared to the water seal.

The use of a conventional water seal or relief valve that vents to atmosphere does not resolve the potential for anode under-pressurization. Furthermore, anode under-pressurization is the more common process upset than anode over-pressurization because it often occurs whenever the fuel cell drops load quickly, such as to zero power output. There are several mechanisms for the fuel cell to drop load quickly, for example, inverter fault or grid fluctuation which requires the inverter to shut down. Thus, when the anode under-pressure protection system is provided it is anticipated that it would be activated frequently.

Therefore, a need exists for improved technology that can be used to limit the extent of both over-pressurization and under-pressurization of the anode relative to the cathode, thereby reducing the risk of damage to the fuel cell. The system and method described in the examples below are configured to resolve anode under-pressurization protection by allowing a non-oxidizing gas to flow into the area of low pressure, thereby limiting the magnitude of the low pressure while also improving anode over-pressure protection.

SUMMARY

In certain embodiments, a fuel cell system includes at least one fuel cell module and at least one relational water seal configured to limit a magnitude of a pressure differential in the fuel cell system in an anode under-pressurization situation in which the second pressure exceeds the first pressure by at least a first predetermined amount. The fuel cell module includes a fuel cell assembly having one or more fuel cells arranged in a stack configuration, an anode inlet manifold, an anode outlet manifold having a first pressure, a cathode inlet manifold having a second pressure, and a cathode outlet manifold.

In some aspects, the fuel cell system further includes a first relational water seal and a second relational water seal. The first relational water seal is configured to limit a magnitude of a pressure differential in the fuel cell system in an anode over-pressurization situation in which the first pressure exceeds the second pressure by at least a second predetermined amount. The second relational water seal is configured to limit the magnitude of the pressure differential in the fuel cell system in the anode under-pressurization situation in which the second pressure exceeds the first pressure by at least the first predetermined amount. The first relational water seal and the second relational water seal may operate independently of one another.

In some aspects, the fuel cell system further includes a bidirectional water seal configured to limit the magnitude of the pressure differential in the fuel cell system in the anode under-pressurization situation in which the second pressure exceeds the first pressure by at least the first predetermined amount, and to limit a magnitude of a pressure differential in the fuel cell system in an anode over-pressurization situation in which the first pressure exceeds the second pressure by at least a second predetermined amount.

In some aspects, the bidirectional water seal includes a tank configured to hold a predetermined level of water, a first pipe connected to the tank, neither end of the first pipe being submerged in the water, a second pipe connected to the tank, neither end of the second pipe being submerged in the water, and a baffle wall extending from a top of the tank towards the water, the baffle wall dividing an interior of the tank into a first portion and a second portion. A gap exists between the baffle wall and a bottom of the tank, the gap configured to allow water and anode gas to travel therethrough. The baffle wall may be positioned in a center of a width of the tank, thereby dividing the tank into a first portion and a second portion having equal areas, or the baffle wall may be positioned off center of a width of the tank, thereby dividing the tank into a first portion and a second portion having unequal areas. The baffle wall may include a jog therein.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The accompanying drawings, which are included to provide further understanding of the invention, are incorporated in and constitute a part of this specification, illustrate embodiments of the present disclosure and together with the detailed description serve to explain the principles of the present disclosure. No attempt is made to show structural details of the present disclosure in more detail than may be necessary for a fundamental understanding of the present disclosure and the various ways in which it may be practiced.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology is for the purpose of description only and should not be regarded as limiting. An effort has been made to use the same or like reference numbers throughout the drawings to refer to the same or like parts.

Figure 1A:
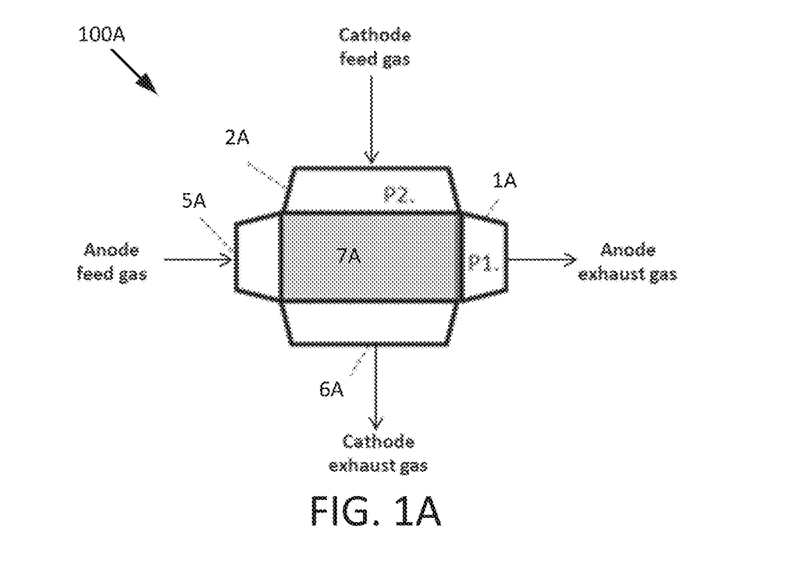
FIG. 1A illustrates a fuel cell according to a first embodiment.

FIG. 1A is a schematic diagram of a fuel cell module 100A according to a first embodiment. The fuel cell module 100A includes a fuel cell assembly 7A, which may comprise one or more fuel cells in a stacked arrangement. Each fuel cell in the fuel cell assembly 7A includes an anode, a cathode, and electrolyte therebetween. Four manifolds 1A, 2A, 5A, and 6A positioned on the four side surfaces of the fuel cell assembly 7A. In particular, the fuel cell module 100A includes a cathode inlet manifold 2A, a cathode exhaust manifold 6A, an anode inlet manifold 5A, and an anode exhaust manifold 1A. The manifolds 1A, 2A, 5A, and 6A provide sealed passages for delivering the fuel and the oxidant gases to the one or more fuel cells of the fuel cell assembly 7A within the fuel cell module 100A and directing the flow of such gases to the one or more fuel cells of the fuel cell assembly 7A, thereby preventing the fuel and oxidant gases from leaking either to the environment or to the other manifolds.

Figure 1B:
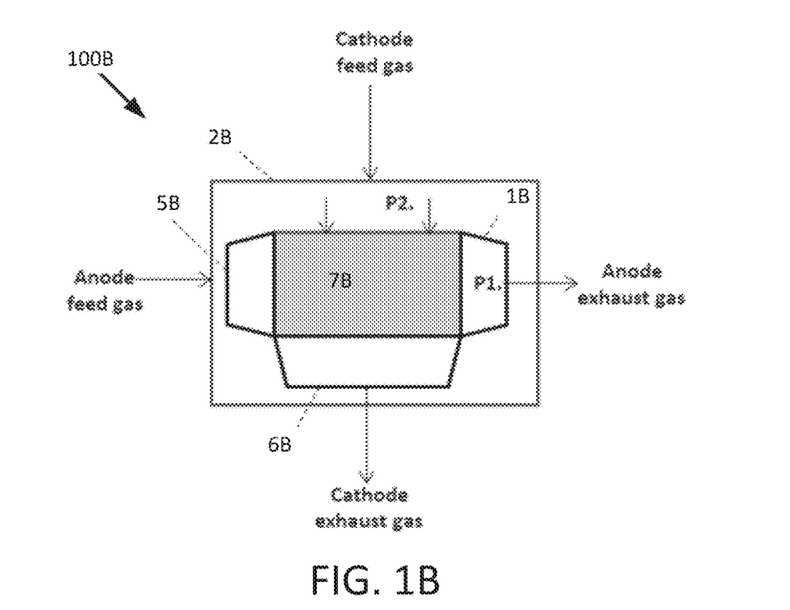
FIG. 1B illustrates a fuel cell according to a second embodiment.

FIG. 1B is a schematic diagram of a fuel cell module 100B according to a second embodiment. The fuel cell module 100B includes a fuel cell assembly 7B, which may comprise one or more fuel cells in a stacked arrangement. Each fuel cell in the fuel cell assembly 7B includes an anode, a cathode, and electrolyte therebetween. Manifolds 1B, 5B, and 6B are positioned on three side surfaces of the fuel cell assembly 7B. In particular, a cathode exhaust manifold 6B, an anode inlet manifold 5B, and an anode exhaust manifold 1B are positioned on three side surfaces of the fuel cell assembly 7B. A vessel 2B encloses and contains the fuel cell assembly 7B, the cathode exhaust manifold 6B, the anode inlet manifold 5B, and the anode exhaust manifold 1B. The vessel 2B may be used as a cathode inlet manifold. The vessel 2B, the cathode exhaust manifold 6B, the anode inlet manifold 5B, and the anode exhaust manifold 1B deliver the fuel and the oxidant gases to the one or more fuel cells of the fuel cell assembly 7B and direct the flow of such gases to the one or more fuel cells of the fuel cell assembly 7B, thereby preventing the fuel and oxidant gases from leaking either to the environment or to the other manifolds.

The fuel cell module 100A, 100B may be, for example, high-temperature fuel cell module such as a Molten Carbonate Fuel Cell (MCFC), which operates at approximately 550-650° C. Although a MCFC is described as an example of the fuel cell module 100A, 100B, the concepts disclosed herein are not limited in this regard. The fuel cell module 100A, 100B may be any known type of fuel cell module, including other high temperature fuel cell modules. The fuel cell system may include a single fuel cell module 100A, 100B, a plurality of fuel cell modules 100A, or a plurality of fuel cell modules 100B, where individual fuel cell modules 100A, 100B are arranged in series or in parallel. At least one fuel cell stack may be disposed within a containment or housing unit to form a fuel cell module. The fuel cell system may include one or more fuel cell modules. Although the figures below, which illustrate a fuel cell system 1000 include the fuel cell module 100A, the concepts disclosed herein are not limited in this regard. In any of the examples described below, the fuel cell system 1000 may include the fuel cell module 100B instead of the fuel cell module 100A.

Figure 2:
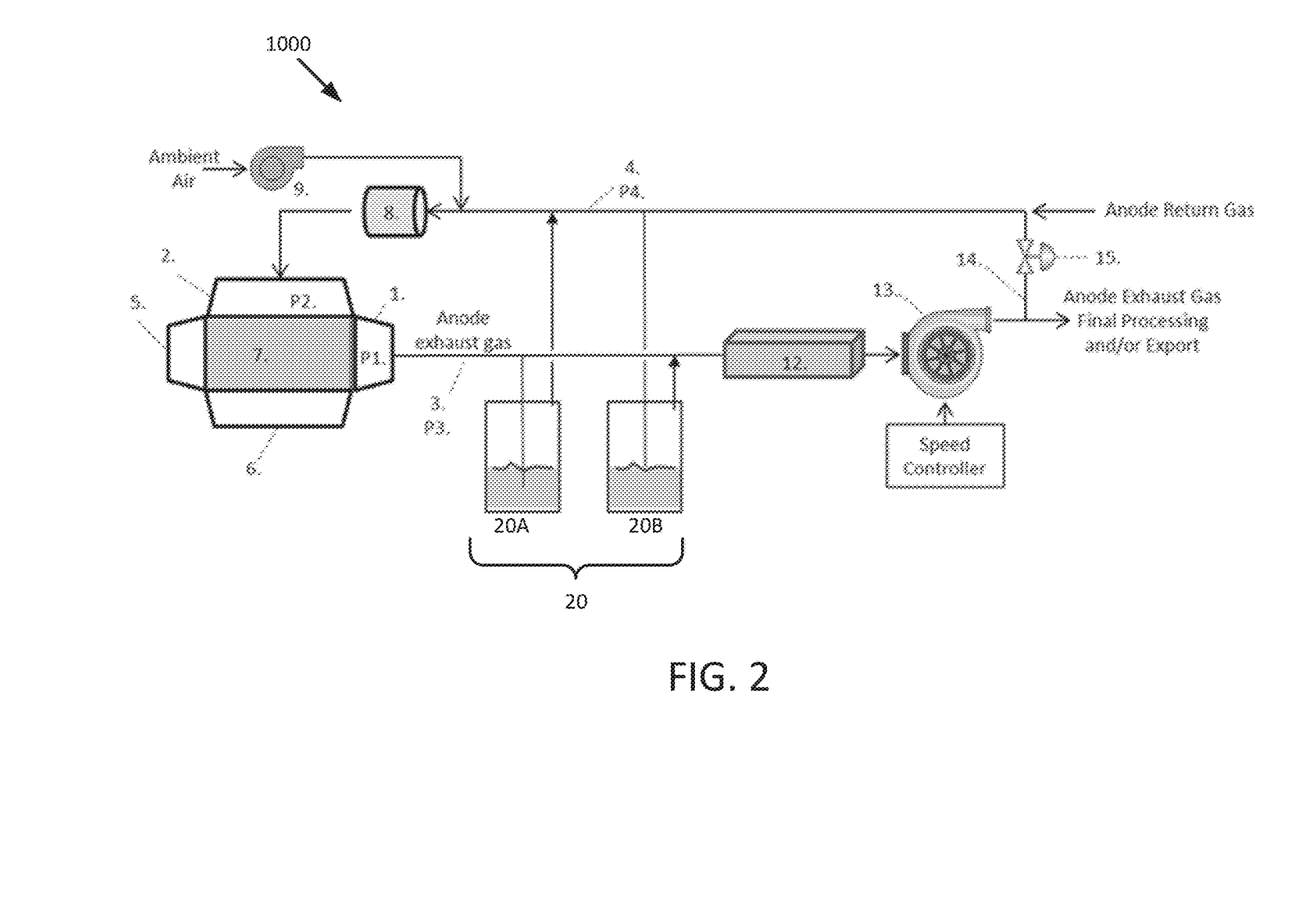
FIG. 2 illustrates a fuel cell system including a first relational water seal and a second relational water seal configured to resolve an anode over-pressurization condition and an anode under-pressurization condition, respectively. The fuel cell of FIG. 1A or FIG. 1B can be used in the fuel cell system.
Figure 3:
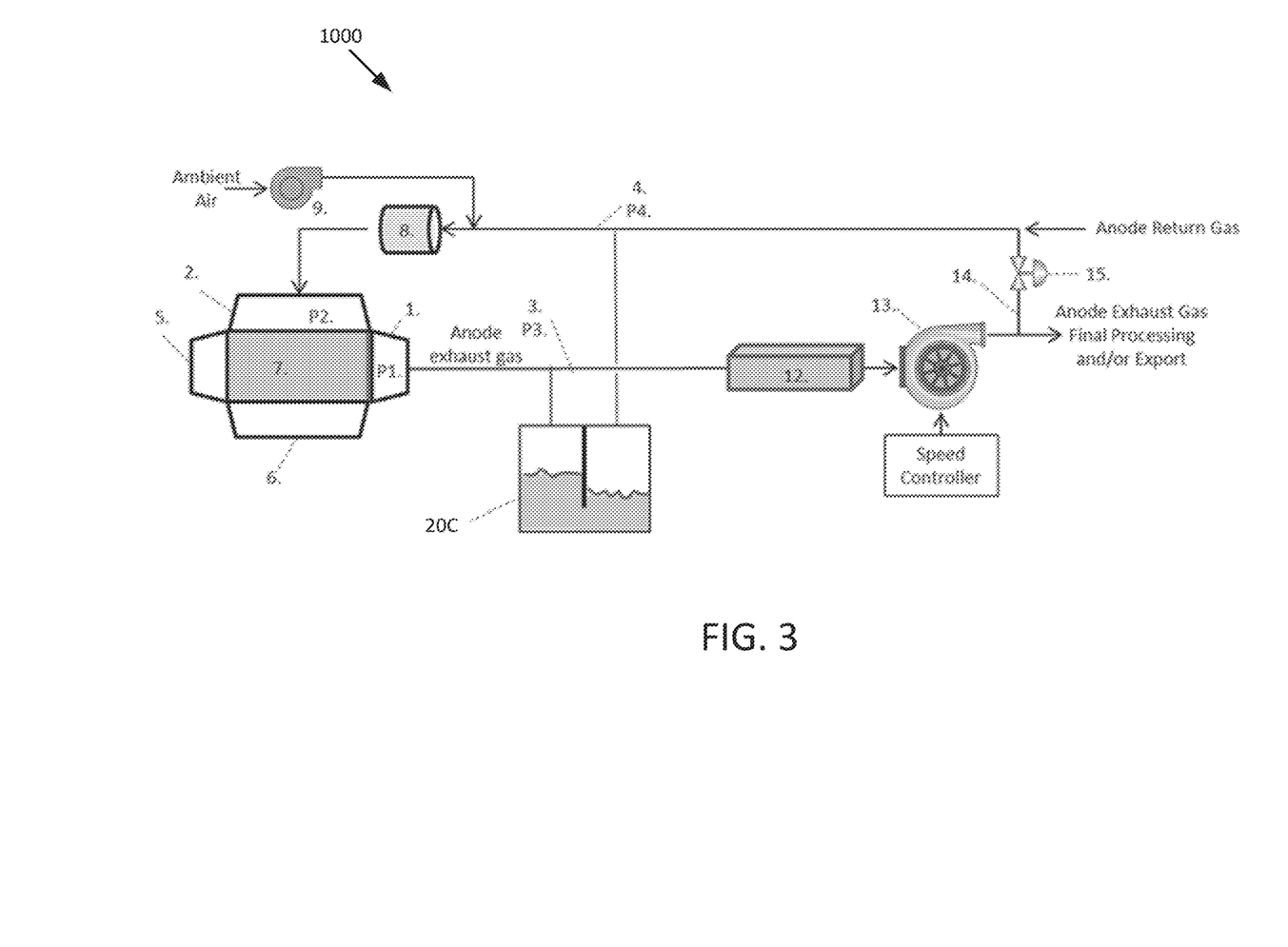
FIG. 3 illustrates a fuel cell system including a bidirectional relational water seal configured to resolve an anode over-pressurization condition and an anode under-pressurization condition. The fuel cell of FIG. 1A or FIG. 1B can be used in the fuel cell system.

In the examples of FIGS. 2 and 3, a fuel cell system 1000 includes at least one fuel cell (e.g., the fuel cell module 100A of FIG. 1A or the fuel cell module 100B of FIG. 1B) and an anode exhaust processing system 12. The anode exhaust processing system 12 is configured to process anode exhaust gas output from the anode exhaust manifold 1 of the at least one fuel cell. The fuel cell system 1000 further includes an anode exhaust gas blower 13 incorporated to offset the added pressure drop of the anode exhaust processing system 12, in order to pressure balance the anode exhaust manifold 1 and the cathode inlet manifold 2. All of the anode exhaust gas is pumped by the anode exhaust gas blower 13. Once pumped by the anode exhaust gas blower 13, part or all of the anode exhaust gas may be sent directly to the anode gas oxidizer 8 via the anode export bypass control valve 15, or sent to final processing and/or export. Whether the anode exhaust gas goes directly through the anode export bypass control valve 15 or indirectly through additional processing, anode exhaust gas returning to the anode gas oxidizer 8 is termed "anode return gas." The anode return gas is combined with air and then passed through the anode gas oxidizer 8 for processing and delivery as oxidant supply gas to the cathode inlet manifold 2. In this way, the anode return line is always close to the pressure of the cathode inlet manifold 2. In a full closed state of the anode export bypass control valve 15, all of the anode exhaust gas is delivered for final processing, in which case certain components of the anode exhaust gas may be separated for export. The remaining gas returns to the process as anode return gas. In some aspects, the anode gas oxidizer 8 may be a mixer-eductor-oxidizer (MEO), but is not limited in this regard. The output of the anode gas oxidizer 8 is delivered as oxidant supply gas to the cathode inlet manifold 2. The anode return line normally has a higher pressure than the anode exhaust line, by a few inches of water column, due to the anode exhaust gas blower 13, which is operated to keep the pressure difference between the anode and the cathode at the optimum pressure, typically a very low pressure difference.

The speed of the anode exhaust gas blower 13 is controlled by a speed controller to maintain a certain pressure differential between P1 (a pressure in the anode exhaust manifold) and P2 (a pressure in the cathode inlet manifold). The speed controller may be part of a control assembly programmed to control at least one of the speed of the anode exhaust gas blower 13, the speed of the fresh air blower 9, or the opening degree of the anode export bypass control valve 15 to control, for example, the amount of anode exhaust gas recycled by the anode exhaust gas blower 13 to the anode gas oxidizer 8 and/or the amount of ambient air mixed with the anode exhaust gas upstream of the anode gas oxidizer 8. The control assembly may also be programmed to implement any of the method or control steps described herein.

In aspects in which the anode gas oxidizer 8 is a MEO, the MEO is configured to oxidize unspent fuel present in the anode exhaust gas, to preheat the cathode inlet gas (i.e., oxidant supply gas). More specifically, the mixer-eductor ignites and starts burning the unspent fuel and air prior to conveying the mixture through the oxidizer. This improves the overall performance of the MEO by reducing condensation of vapors on a catalyst bed of the oxidizer and improving the temperature distribution in the fuel cell system. Any known MEO design may be used in the fuel cell system of the present application. For example, U.S. Pat. No. 9,190,676 describes a flame stabilized MEO for high temperature fuel cells. The entire contents of U.S. Pat. No.

9,190,676 are incorporated herein by reference in its entirety for all purposes (including its disclosure related to MEO designs).

A desired control point for a pressure P1 in the anode exhaust manifold 1 is very close to a pressure P2 in the cathode inlet manifold 2. For example, the speed controller for the anode exhaust gas blower 13 may be programmed to maintain P1 to the inches of water column pressure (iwc) as P2 within plus or minus 2 inches. By low pressure drop design, the pressure P3 of the anode exhaust gas in the anode exhaust line 3 is very close to the pressure P1 in the anode exhaust manifold 1, for example, within 0.5 iwc to 2.0 iwc. By low pressure drop design, a pressure P4 in an anode return line 4 is only a few inches of water column pressure greater than the pressure P2 in the cathode inlet manifold 2. Essentially, the difference in pressure is the pressure drop of the MEO or anode gas oxidizer 8, which is often at least 1.5 iwc, but may be as high as 5 iwc. Therefore, under normal operating conditions of the fuel cell system, there is a relatively constant relationship between P3 and P4, where P4 is a few inches of water column pressure greater than P3 (for example, 1.5 to 5.0 iwc) due to the pressure drop across the anode gas oxidizer 8.

As discussed above, a number of process upsets can cause the anode exhaust pressure P1 to be lower than the cathode inlet pressure P2. This is called anode under-pressurization. Process upsets that may cause anode under-pressurization include, but are not limited to, a sudden drop in fuel cell power output, a sudden opening of an anode export bypass control valve 15, and overspeed of the anode exhaust gas blower 13, for example, due to malfunction of the blower speed controller. Alternatively, a number of process upsets can cause the anode exhaust pressure P1 to be greater than the cathode inlet pressure P2. This is called anode over-pressurization. Process upsets that may cause anode over-pressurization include, but are not limited to, a rapid increase in fuel cell power output, a sudden closure of anode export bypass control valve 15, a sudden increase in anode return gas from the gas export system, and underspeed of the anode exhaust gas blower 13, for example due to a speed controller (VFD) fault, loss of power to drive, or other malfunction of the blower speed controller.

To prevent excessive anode under-pressurization and anode over-pressurization, which could damage the fuel cell or the fuel cell seals, for example with P1 different than P2 by more than a predetermined value such as +/−15 iwc, the fuel cell system includes one or more relational water seals 20 to limit the magnitude of the pressure difference to less than a predetermined value, such as lower than 15 iwc. FIG. 2 illustrates a fuel cell system with two relational water seals 20. In particular, the fuel cell system includes a first relational water seal 20A configured to prevent anode over-pressurization, and a second relational water seal 20B configured to prevent anode under-pressurization. FIG. 3 illustrates a fuel cell system with a bidirectional water seal 20C configured to prevent anode over-pressurization and anode under-pressurization. The only difference between FIG. 2 and FIG. 3 is that the two relational water seals 20A, 20B of FIG. 2 are combined in FIG. 3 to form the bidirectional water seal 20C.

Figure 4:
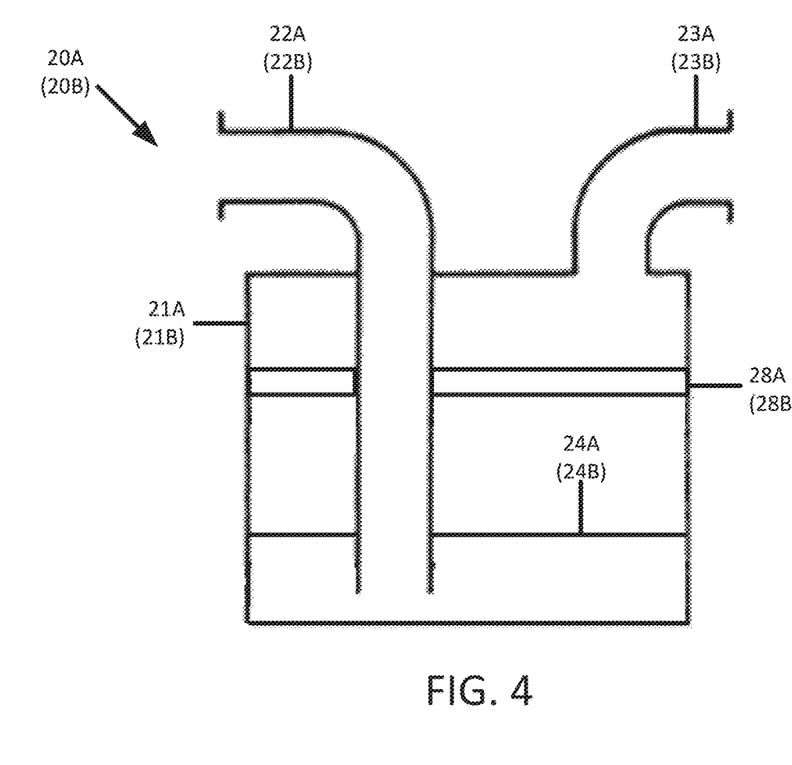
FIG. 4 illustrates the structure of first relational water seal and the second relational water seal of FIG. 2.

FIG. 4 illustrates the structure of the first relational water seal 20A and the second relational water seal 20B. The first relational water seal 20A and the second relational water seal 20B have the same structure. In particular, the first relational water seal 20A includes a tank 21A having a first pipe 22A that is submerged in a predetermined level of water and a second pipe 23A that extends from a top surface of the tank 21A. The second relational water seal 20B includes a tank 21B having a first pipe 22B that is submerged in a predetermined level of water and a second pipe 23B that extends from a top surface of the tank 21B. Reference numerals 24A, 24B identify the water line (i.e., a location of the top surface of the water). The first pipe 22A of the first relational water seal 20A is in fluid communication with the anode exhaust line 3, while the second pipe 23A is in fluid communication with the anode return line 4. The first pipe 22B of the second relational water seal 20B is in fluid communication with the anode return line 4, while the second pipe 23B is in fluid communication with the anode exhaust line 3. The first relational water seal 20A and the second relational water seal 20B may optionally include a demister 28A, 28B fitted upstream of the second pipe 23A, 23B to remove water droplets that may be carried over with the gas output from the second pipe 23A, 23B. The demister 28A, 28B may be, for example, a wire mesh demister pad.

In the case of over-pressurization, anode exhaust gas from the anode exhaust line 3 bubbles through the first relational water seal 20A and is released to the anode gas return line 4, thereby alleviating the over-pressurization and reducing the risk of damage to the fuel cell by limiting the magnitude of the overpressure. Conventional fuel cell systems do not include a relational water seal such as the first relational water seal 20A, for example, because the anode exhaust line is connected directly to the anode return line with no blower or other equipment in between. In some of these conventional fuel cell systems, a simple water seal with vent to atmosphere is used. However this would require active level control of the simple water seal based on an actual system pressure relative to atmosphere. Also, the protective level of water in the simple water seal will only be appropriate as controlled at the steady operation, and takes time to change the level. Therefore, the simple water seal that is related to atmosphere may lose ability to protect the fuel cell from damage due to having an inappropriate level as system pressures fluctuate during upset operations. Such is not the case with the relational water seal 20 (e.g., the first relational water seal 20A) described in this example.

In the case of under-pressurization, anode return gas from the anode gas return line 4 bubbles through the second relational water seal 20B and is released to the anode exhaust line 3, thereby alleviating the under-pressurization and reducing the risk of damage to the fuel cell. Conventional fuel cell systems do not include a relational water seal such as the second relational water seal 20B. In these conventional fuel cell systems, there is no way to remedy the under-pressurization situation if one occurs.

Figure 5:
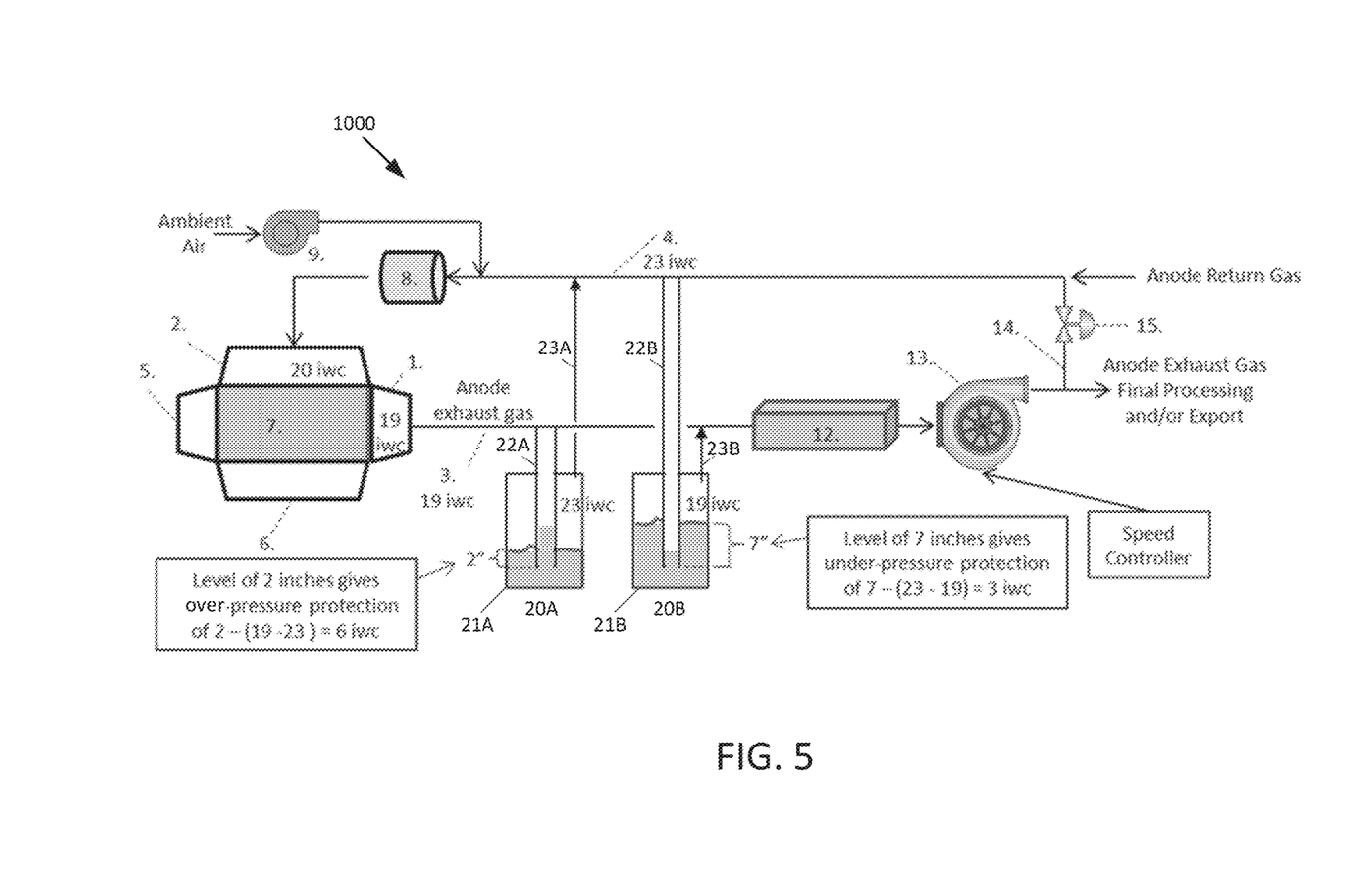
FIG. 5 illustrates an example of the fuel cell system of FIG. 1 including predetermined steady-state operating pressures assigned to the fuel cell and piping system. T The fuel cell of FIG. 1A or FIG. 1B can be used in the fuel cell system.

The operation of the relational water seals 20A and 20B will now be described, with reference to FIG. 5. As seen in FIG. 5, predetermined steady-state operating pressures are assigned to the fuel cell and piping system. The tank 21A of the first relational water seal 20A and the tank 21B of the second relational water seal 20B are each filled to a predetermined water level to provide the desired protection. The protection provided by the first relational water seal 20A and the second relational water seal 20B is related to the water level within the first pipe 22A, which is submerged in the water in the tank 21A. The water level in the first pipe 22A differs from the water level in the tank 21A, according to a pressure differential between the first pipe 22 and the second pipe 23A. In the example of FIG. 5, in the first relational water seal 20A, the pressure in the first pipe 22A is 19 iwc (i.e., P3). In other words, the first pipe 22A has essentially the same pressure as the anode exhaust line. This pressure is communicated through the water in the tank 21A to the anode gas return line 4, which has a pressure of 23 iwc (i.e., P4). Thus, the second pipe 23A has a pressure approximately equal to the pressure of the anode return line, which is slightly higher than the pressure of the anode exhaust line during normal operation. Since the pressure in the tank 21A is greater than the pressure in the first pipe 22A, the water is forced up the first pipe 22A to a height that is higher than the water level in the tank 21A. For example, the height of the water in the first pipe 22A may be about 4 inches higher (e.g., 23"-19") than the water level in the tank 21A. In the example of FIG. 5, the tank 21A is filled to a level 2" higher than the outlet (i.e., bottom) of the first pipe 22A. Therefore the height of water in the first pipe 22A is 6". If at any time the pressure P3 in the anode exhaust line 3 exceeds the pressure P4 in the anode return line 4 by 6 iwc or more, the anode exhaust line 3 will push the water out the first pipe 22A and output anode exhaust gas to the anode return line 4, thereby relieving pressure and limiting the extent of over-pressure to 6 iwc at P3 relative to P4. Because of the pressure drop from anode gas return line 4 (at P4) to the cathode inlet P2 of about 3 iwc, this equates to a differential at the fuel cell P1 relative to P2 of +3 iwc versus the normal operating point of −1 iwc.

In the example of FIG. 5, in the second relational water seal 20B, the anode return gas pressure in the first pipe 22B is 23 iwc (i.e., P4). Since the pressure in the tank 21B (i.e., 19 iwc or P3) is less than the pressure in the first pipe 22B, the water is forced down the first pipe 22B to a height that is lower than the water level in the tank 21B. For example, the height of the water in the first pipe 22B may be about 4 inches lower (e.g., 23"-19") than the water level in the tank 21B. In the example of FIG. 5, the tank is filled to a level 7" higher than the outlet (i.e., bottom) of the first pipe 22B. Therefore the height of water in the first pipe 22B is 3". If at any time the pressure P3 in the anode exhaust line 3 is lower than the pressure P4 in the anode return line 4 by 3 iwc or more, the anode return line 4 will push the water out the first pipe 22B and output anode return gas to the anode exhaust line 3, thereby relieving the suction or under-pressure and limiting the extent of under-pressure to 3 iwc at P3 relative to P4. Because of the pressure drop from anode gas return line 4 (at P4) to the cathode inlet P2 of about 3 iwc, this equates to a differential at the fuel cell P1 relative to P2 of approximately −4 iwc versus the normal operating point of approximately −1 iwc.

The first relational water seal 20A operates independently of the second relational water seal 20B and vice versa. Therefore, if protection from only anode under-pressurization is desired, the second relational water seal 20B can be installed alone without the first relational water seal 20A, and if protection from only anode over-pressurization is desired the first relational water seal 20A can be installed alone without the second relational water seal 20B.

Figure 6:
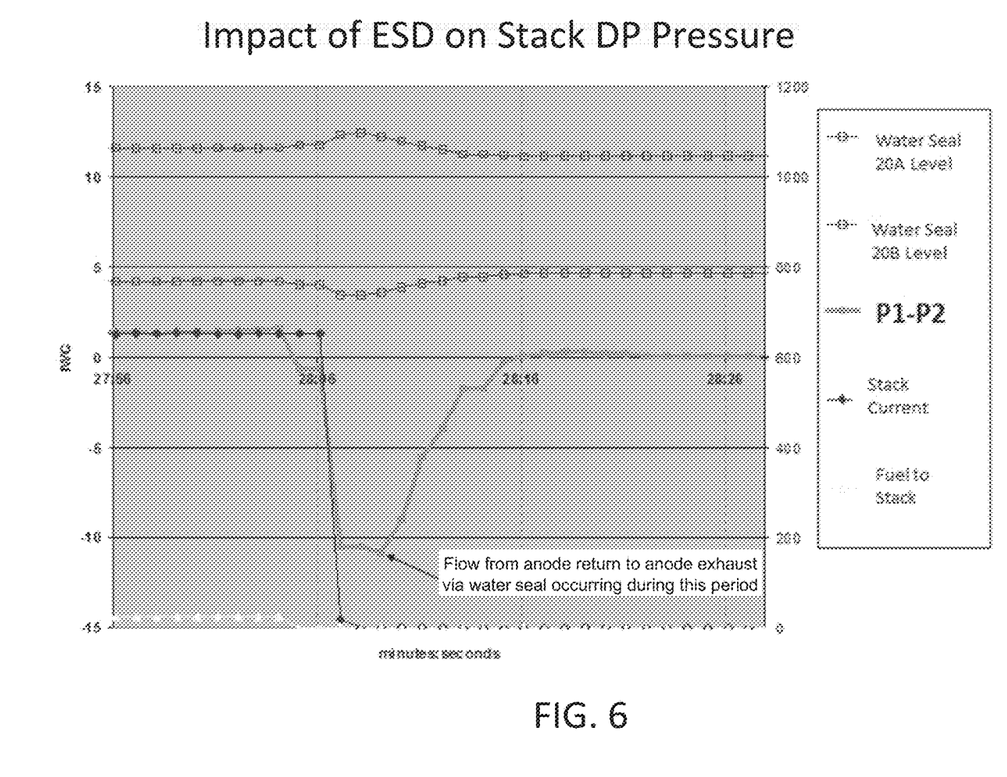
FIG. 6 is a graph illustrating an example of a pressure balance of the fuel cell system of FIG. 5, showing the anode under pressure achieved and the response of the water seal during an immediate power production to zero, which is an upset operating condition.

FIG. 6 shows an example of the pressure balance data of a fuel cell system during a trip, otherwise termed Emergency Shut Down (ESD), which occurs with an immediate loss of load and stop of all process flows. Immediately after the trip, the inlet pressure of the anode exhaust blower rapidly decreases until the water seal limit is reached, and then the pressure differential stops at that point, in this case limiting the pressure differential to 10 iwc. This pressure spike only lasts 2 to 4 seconds, but it would be greater without the water seal and could potentially damage the fuel-cell manifolds.

Figure 7:
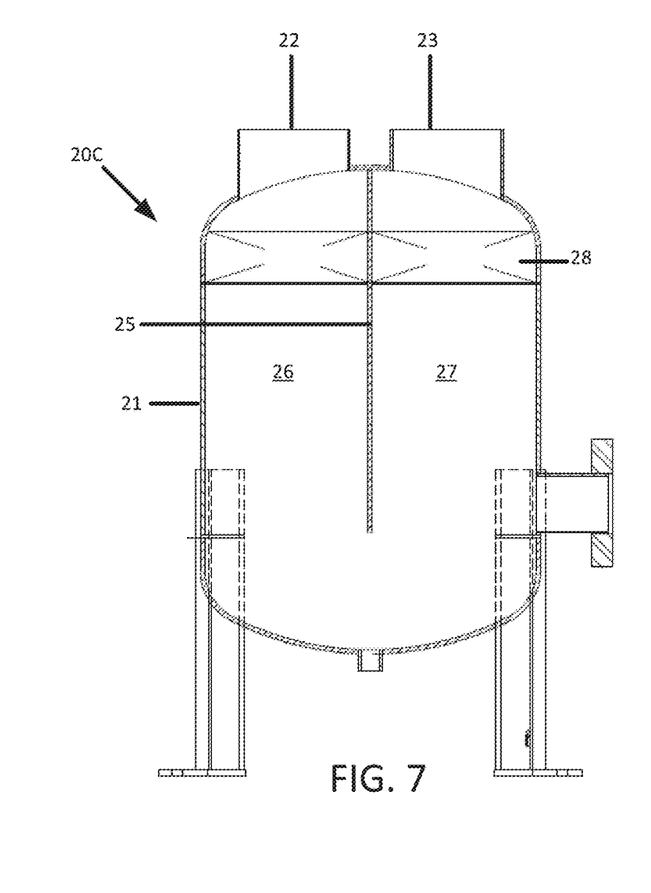
FIG. 7 illustrates the structure of bidirectional relational water seal of FIG. 3.
Figure 8:
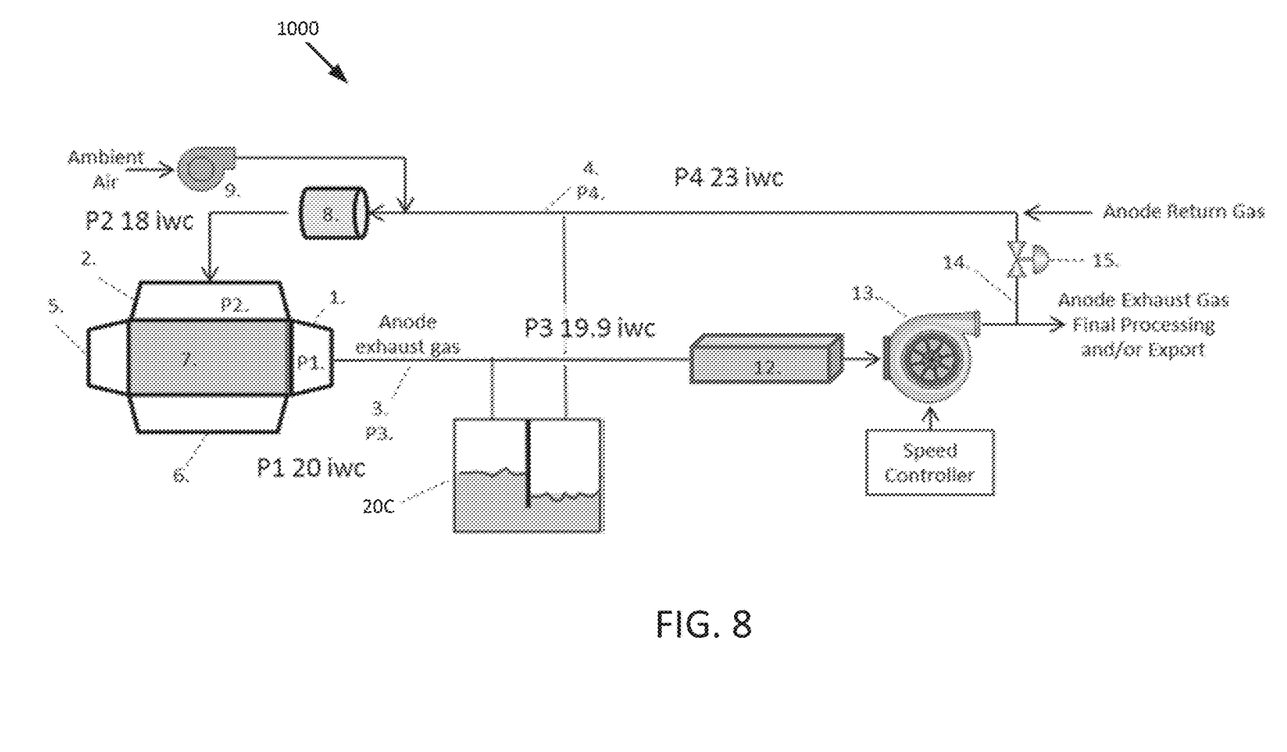
FIG. 8 illustrates an example of the fuel cell system of FIG. 3 including predetermined steady-state operating pressures assigned to the fuel cell and piping system.
Figure 9A:
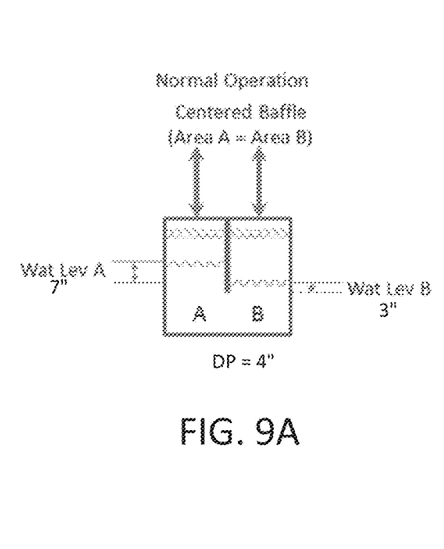
FIG. 9A illustrates an example of the water level of a first portion A and the water level of a second portion B of the bidirectional relational water seal of FIG. 7 during normal operation.
Figure 9B:
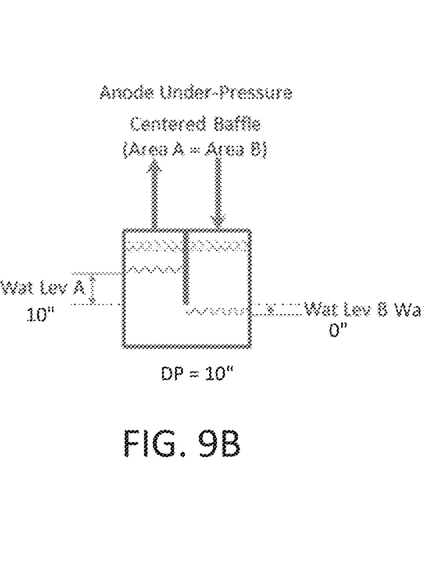
FIG. 9B illustrates the water level of the first portion A and the water level of the second portion B of the bidirectional relational water seal of FIG. 9A during anode under-pressurization.
Figure 9C:
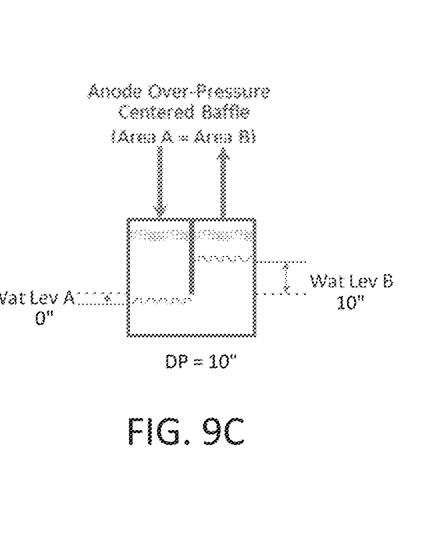
FIG. 9C illustrates the water level of the first portion A and the water level of the second portion B of the bidirectional relational water seal of FIG. 9A during anode over-pressurization.

FIG. 7 illustrates the structure of one example of the bidirectional water seal 20C. The bidirectional water seal 20C includes a tank 21 having a first pipe 22 in fluid communication with the anode exhaust line 3, a second pipe 23 in fluid communication with the anode return line 4, and a baffle wall 25 submerged in a predetermined level of water contained in the tank 21. Unlike the first and second relational water seals 20A and 20B, the first pipe 22 of the bidirectional water seal 20C is not submerged in water in the tank 21. Instead, both the first pipe 22 and the second pipe 23 of the bidirectional water seal 20C are connected to a top surface of the tank 21. The baffle wall 25 is provided in an interior of the tank 21 and extends from a top surface of the interior of the tank 21 downwards to below the water level contained in the tank 21, but does not extend all the way to the bottom of the tank (i.e., a gap exists between the bottom of the baffle wall 25 and the bottom of the tank 21). In one example (see FIGS. 7 and 9A-9C), the baffle wall 25 is provided in a center of the width of the tank 21, thereby dividing the tank 21 into a first portion A and a second Portion B having equal area.

If a different pressure is desired in the bidirectional water seal 20C for anode over-pressure and anode under-pressure, the baffle wall 25 will need to be located off-center with respect to a width of the tank 21. Therefore, in other examples (see FIGS. 10A-10C and 11A-11C), the baffle wall 25 may be provided off-center of the width of the bidirectional water seal 20C, thereby dividing the bidirectional water seal 20C into the first Portion A and the second Portion B, having unequal areas. In particular, an area of the second Portion B is a multiple of an area of the first Portion A. For example, the area of the second Portion B may be two times the area of the first Portion A. It may be preferable to use an off-center baffle wall 25 as it reduces a pressure differential (DP) in the over-pressure case (compare FIGS. 9A-9C with FIGS. 10A-10C).

Figure 11A:
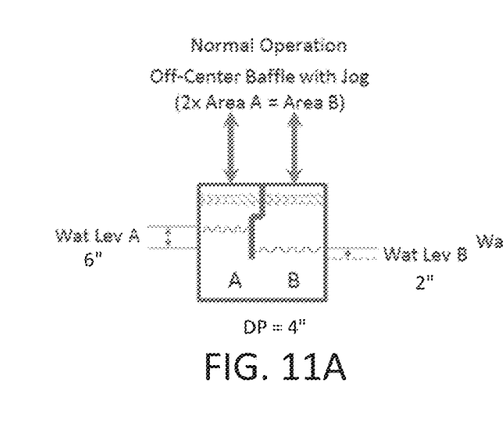
FIG. 11A illustrates the water level of a first portion A and the water level of a second portion B of a bidirectional relational water seal having an off center baffle wall with a jog therein, during normal operation.
Figure 11B:
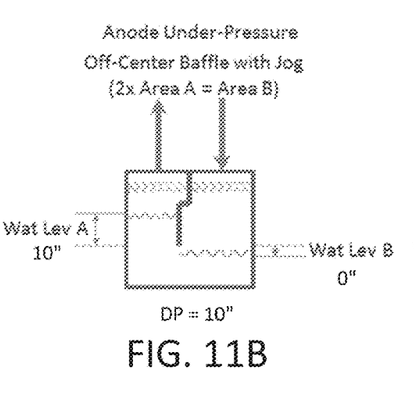
FIG. 11B illustrates the water level of the first portion A and the water level of the second portion B of the bidirectional relational water seal of FIG. 11A during anode under-pressurization.
Figure 11C:
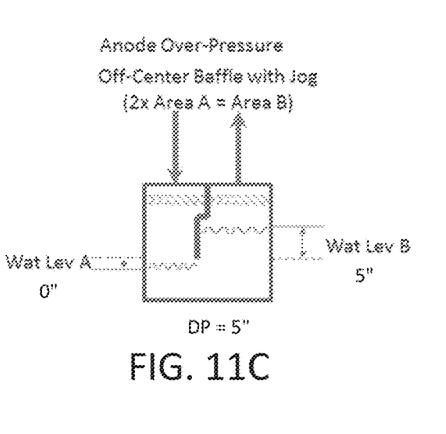
FIG. 11C illustrates the water level of the first portion A and the water level of the second portion B of the bidirectional relational water seal of FIG. 11A during anode over-pressurization.

Use of an off-center baffle wall 25 may result in a higher velocity in the outlet during an under-pressure case. To address the concern regarding higher velocity in the outlet, as seen in FIGS. 11A-11C, an off-center baffle wall including at least one jog or bend therein may be used. A jog may be provided on a centered baffle, but this is generally not needed since the overpressure and under pressure flow rates are typically similar.

Referring to examples of a bidirectional water seal 20C illustrated in FIGS. 9A-11C, it is noted that the tank 21 is three-dimensional, and FIGS. 9A-11C illustrate a two-dimensional conceptualization of the tank 21, according to a series of non-limiting embodiments. One of ordinary skill in the art would understand that the water levels are only examples, and the concepts described herein are not limited to these specific examples. The term "area" as used in the description of FIGS. 9A-11C refers to a floor area or horizontal surface area of the first Portion A and the second Portion B (when viewing the bidirectional water seal 20C from a plan view). One of ordinary skill in the art would understand that the volume of the tank 21 equals the floor area times the height, and the height of the first Portion A is equal to a height of the second Portion B. Thus, Volume A/Volume B is equivalent to Floor Area A/Floor Area B.

Any of the examples of the bidirectional water seal 20C may optionally include a demister 28 fitted between the water and each of the first pipe 22 and the second pipe 23 (see FIG. 7). The demister 28 is configured to remove water droplets that may be carried over with the anode exhaust gas output from the bidirectional water seal 20C allowing a smaller diameter vessel to be used for the water seal. The demister 28 may be, for example, a wire mesh demister pad. Flow through the bidirectional water seal 20C will be discussed in further detail below.

The operation of the bidirectional water seal 20C will now be described with reference to FIGS. 8 and 9A-9C. The water level in the tank 21 is set so that when the pressure differential across the tank 21 is greater than the desired amount, water is pushed to a side of the baffle wall 25 having a lower pressure, and then anode gas will bubble underneath the baffle wall 25 and balance the pressures. Applying the pressures from the example of FIG. 5, during normal operation the tank level on the first Portion A will be 4" higher than the second Portion B because the pressure of the first Portion A is 19 iwc (i.e., P3) and the pressure of the second Portion B is 23 iwc (i.e., P4). During upset conditions, when gas is flowing through the bidirectional water seal 20C to equalize pressure, all of the water is pushed to one side of the tank 21, allowing the gas to bubble underneath the baffle wall 25. The water level is chosen such that when all of the water is pushed to one side of the tank 21, the height of the water relative to the bottom of the baffle wall 25 is equal to the maximum differential pressure desired. For example, if the water level is set to 3" above the bottom of the baffle wall 25 on the second Portion B during normal operation, the water level will be 7" above the bottom of the baffle wall 25 on the first Portion A. Thus, the anode over-pressure protection will be (3+7) 10 iwc since when all of the water is pushed to one side of the tank 21, the water level will be 10 inches above the bottom of the baffle wall 25. This accounts for the level change from the water transferring from one side to the other to allow gas to bubble under the baffle wall 25 (i.e., 10 iwc total at P3 relative to P4, which equates to 13 iwc at P1 relative to P2). The anode under-pressure protection will be the same if the baffle wall 25 is located in the center of the tank. The added pressure to activate the seal (i.e., cause gas to flow under the baffle wall 25) is two times the water level from the low water level side of the tank to the bottom of the baffle wall 25 with a centered baffle design and the area on each side of the baffle wall 25 being equal since pushing down the water level on one side increases the level of the water on the opposite side by the same amount. To account for the level change from the water transferring sides to allow gas to bubble under the baffle (i.e., −10 iwc total at P3 relative to P4, which equates to −7 iwc at P1 relative to P2).

Figure 10A:
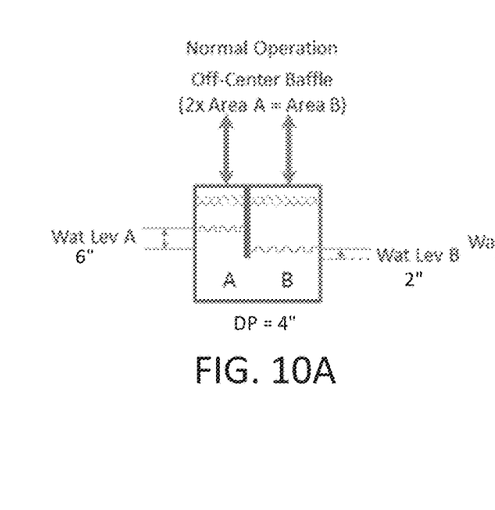
FIG. 10A illustrates the water level of a first portion A and the water level of a second portion B of a bidirectional relational water seal having an off center baffle wall, during normal operation.
Figure 10B:
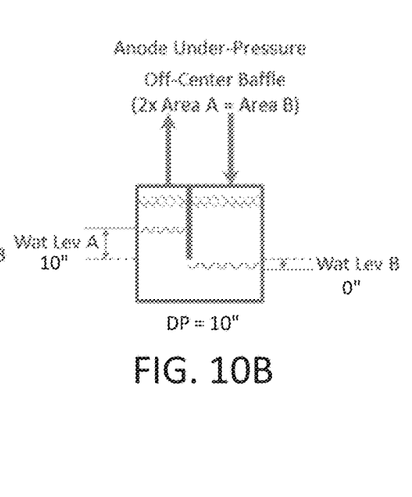
FIG. 10B illustrates the water level of the first portion A and the water level of the second portion B of the bidirectional relational water seal of FIG. 10A during anode under-pressurization.
Figure 10C:
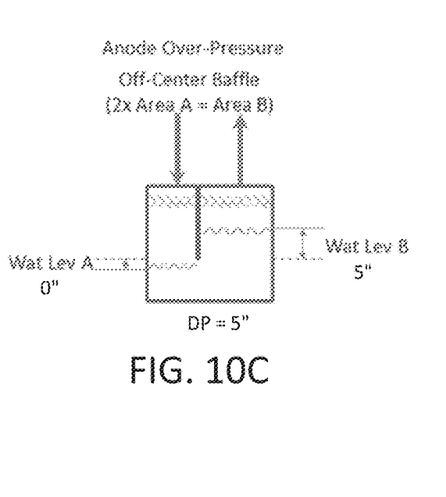
FIG. 10C illustrates the water level of the first portion A and the water level of the second portion B of the bidirectional relational water seal of FIG. 10A during anode over-pressurization.

In order to have the maximum differential pressure the same for both anode under pressure and anode overpressure as measured at P1 and P2, a baffle wall 25 located off-center may be used. For example if the baffle wall 25 is located so that the area of the second Portion B is twice the area of the first portion A, water flowing from the A side to the B side will only raise the water level on the B side by a one half the reduction in level of the A side and vice versa. For example, if the water level is set to 2" above the bottom of the baffle wall 25 in the second Portion B during normal operation, the water level will be 6" above the bottom of the baffle wall 25 in the first Portion A. Thus, the anode over-pressure protection will be 10 iwc since when all of the water is pushed to the first Portion A with ½ the area as the second Portion B, the water level will be 10 inches above the bottom of the baffle wall 25 (i.e., 6+2*2). This accounts for the level change from the water transferring from the B side to allow gas to bubble under the baffle wall 25. This provides 10 iwc total at P3 relative to P4, which equates to 13 iwc at P1 relative to P2. For the anode under-pressure protection, the 6 inches of water in the first Portion A will be pushed to the second Portion B, raising the B side level 3 inches. Thus, the total level on the B side will be 5 inches (2+6/2) to account for the level change from the water transferring sides to allow gas to bubble under the baffle wall 25 (i.e., −5 iwc total at P3 relative to P4, which equates to −8 iwc at P1 relative to P2). By proper selection of the areas on each side of the baffle wall 25, a maximum differential pressure of 10 inches for both the anode overpressure and anode underpressure upsets can be obtained.

The examples of the fuel cell systems described above, which include one or more water seals, provides a better solution to anode pressurization issues because the one or more water seals provide a technical solution to anode under-pressurization, increases reliability, and increases operating range. The use of the first relational water seal 20A and the second relational water seal 20B may be desired for independent selection of over-pressurization protection from under-pressurization protection, and/or faster response. The bidirectional water seal 20C reduces cost, piping, and space required for applications where fast response and changing the offset of the between over-pressurization/under-pressurization controls are not needed.

In general, unless there is a process upset condition, for normal operating conditions there is a relatively constant relationship between P3 and P4, where P4 is just a few iwc greater than P3 due to the pressure drop across the anode gas oxidizer 8. Therefore, the level of water in the relational water seals 20A, 20B and 20C can be set to a constant level and do not need to be modulated. Active fill and drain of the relational water seals 20A, 20B and 20C, is therefore, not necessary.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fuel cell system comprising:
   at least one fuel cell module including:
   a fuel cell assembly having one or more fuel cells arranged in a stack configuration;
   an anode inlet manifold;
   an anode outlet manifold having a first pressure;
   a cathode inlet manifold having a second pressure; and
   a cathode outlet manifold; and
   at least one relational water seal configured to limit a magnitude of a pressure differential in the fuel cell system in an anode under-pressurization situation in which the second pressure exceeds the first pressure by at least a first predetermined amount;
   wherein the at least one relational water seal comprises a first relational water seal and a second relational water seal that operate independently of one another;
   wherein the first relational water seal is configured to limit a magnitude of a pressure differential in the fuel cell system in an anode over-pressurization situation in which the first pressure exceeds the second pressure by at least a second predetermined amount; and
   wherein the second relational water seal is configured to limit the magnitude of the pressure differential in the fuel cell system in the anode under-pressurization situation in which the second pressure exceeds the first pressure by at least the first predetermined amount.

2. The fuel cell system of claim 1, wherein each of the first relational water seal and the second relational water seal comprises:
   a tank configured to hold a level of water;
   a first pipe connected to the tank and having an end thereof submerged in the water, and
   a second pipe connected to the tank and having neither end thereof submerged in the water.

3. The fuel cell system of claim 1, wherein the at least one relational water seal comprises a bidirectional water seal configured to limit the magnitude of the pressure differential in the fuel cell system in the anode under-pressurization situation in which the second pressure exceeds the first pressure by at least the first predetermined amount, and to limit a magnitude of a pressure differential in the fuel cell system in an anode over-pressurization situation in which the first pressure exceeds the second pressure by at least a second predetermined amount.

4. A fuel cell system comprising:
   at least one fuel cell module including:
   a fuel cell assembly having one or more fuel cells arranged in a stack configuration;
   an anode inlet manifold;
   an anode outlet manifold having a first pressure;
   a cathode inlet manifold having a second pressure; and
   a cathode outlet manifold; and
   at least one relational water seal configured to limit a magnitude of a pressure differential in the fuel cell system in an anode under-pressurization situation in which the second pressure exceeds the first pressure by at least a first predetermined amount;
   wherein the at least one relational water seal comprises a bidirectional water seal configured to limit the magnitude of the pressure differential in the fuel cell system in the anode under-pressurization situation in which the second pressure exceeds the first pressure by at least the first predetermined amount, and to limit a magnitude of a pressure differential in the fuel cell system in an anode over-pressurization situation in which the first pressure exceeds the second pressure by at least a second predetermined amount; and
   wherein the bidirectional water seal comprises:
   a tank configured to hold a predetermined level of water;
   a first pipe connected to the tank, neither end of the first pipe being submerged in the water;
   a second pipe connected to the tank, neither end of the second pipe being submerged in the water; and
   a baffle wall extending from a top of the tank into the water, the baffle wall dividing an interior of the tank into a first portion and a second portion; and
   wherein a gap exists between the baffle wall and a bottom of the tank, the gap configured to allow water and anode gas to travel therethrough.

5. The fuel cell system of claim 4, wherein the baffle wall is positioned in a center of a width of the tank, thereby dividing the tank into a first portion and a second portion having equal areas.

6. The fuel cell system of claim 4, wherein the baffle wall is positioned off center of a width of the tank, thereby dividing the tank into a first portion and a second portion having unequal areas.

7. The fuel cell system of claim 6, wherein an area of the second portion is a multiple of an area of the first portion.

8. The fuel cell system of claim 4, wherein the baffle wall includes a jog therein.

9. The fuel cell system of claim 1, further comprising:
   an anode exhaust gas blower;
   an anode exhaust line through which anode exhaust gas output from the anode outlet manifold is transported to the anode exhaust gas blower; and
   an anode return line through which anode return gas output from the anode exhaust gas blower is transported to the cathode inlet manifold.

10. A fuel cell system comprising:
    at least one fuel cell module including:
    a fuel cell assembly having one or more fuel cells arranged in a stack configuration;
    an anode inlet manifold;
    an anode outlet manifold having a first pressure;
    a cathode inlet manifold having a second pressure; and
    a cathode outlet manifold;
    at least one relational water seal configured to limit a magnitude of a pressure differential in the fuel cell system in an anode under-pressurization situation in which the second pressure exceeds the first pressure by at least a first predetermined amount;
    an anode exhaust gas blower;
    an anode exhaust line through which anode exhaust gas output from the anode outlet manifold is transported to the anode exhaust gas blower; and
    an anode return line through which anode return gas output from the anode exhaust gas blower is transported to the cathode inlet manifold;
    wherein the at least one relational water seal comprises:
    a tank configured to hold a level of water;
    a first pipe connected to the tank and having an end thereof submerged in the water; and
    a second pipe connected to the tank and having neither end thereof submerged in the water; and
    wherein the first pipe is in fluid communication with one of the anode exhaust line or the anode return line, and the second pipe is in fluid communication with the other of the anode exhaust line or the anode return line.

11. The fuel cell system of claim 10, wherein:
the first pipe is in fluid communication with the anode exhaust line, the anode exhaust line and the first pipe having a third pressure; and
the second pipe is in fluid communication with the anode return line to the cathode, the anode return line and the second pipe having a fourth pressure higher than the third pressure during normal operation.

12. The fuel cell system of claim 11, wherein in an upset operation condition in which the third pressure exceeds the fourth pressure by a third predetermined amount, the at least one relational water seal is configured such that anode exhaust gas from the anode exhaust line enters the first pipe and pushes the water out of the first pipe, thereby outputting anode exhaust gas through the second pipe to the anode return line and relieving a pressure differential between the third pressure and the fourth pressure.

13. The fuel cell system of claim 10, wherein:
the first pipe is in fluid communication with the anode return line, the anode return line and the first pipe having a fourth pressure;
the second pipe is in fluid communication with the anode exhaust line, the anode exhaust line and the second pipe having a third pressure lower than the fourth pressure.

14. The fuel cell system of claim 13, wherein in an upset operation condition in which the fourth pressure exceeds the third pressure by a fourth predetermined amount, the at least one relational water seal is configured such that anode return gas from the anode return line enters the first pipe and pushes water out of the first pipe, thereby outputting anode return gas through the second pipe to the anode return line and relieving a pressure differential between the third pressure and the fourth pressure.

15. The fuel cell system of claim 4, further comprising:
an anode exhaust gas blower;
an anode exhaust line through which anode exhaust gas output from the anode outlet manifold is transported to the anode exhaust gas blower; and
an anode return line through which anode return gas output from the anode exhaust gas blower is transported to the cathode inlet manifold; wherein:
the first pipe is in fluid communication with the anode exhaust line and the first portion of the tank, and the second pipe is in fluid communication with the anode return line and the second portion of the tank; and
under normal operation conditions, a water level in the first portion of the tank is greater than a water level in the second portion of the tank.

16. The fuel cell system of claim 15, wherein in a situation in which a pressure differential across the tank is greater than a predetermined pressure differential, the bidirectional water seal is configured such that water and anode gas moves to a side of the baffle wall having a lower pressure via the gap to limit a magnitude of a pressure differential between the first portion and the second portion.

17. The fuel cell system of claim 4, wherein the bidirectional water seal is configured to provide pressurization protection for a pressure equivalent to an inches of water column pressure present in the first pipe and the pressure present in the second pipe.

18. The fuel cell system of claim 10, wherein the at least one relational water seal is configured to provide pressurization protection for a pressure equivalent to an inches of water column pressure present in the first pipe and the pressure present in the second pipe.

* * * * *